United States Patent [19]

Ciaperoni

[11] Patent Number: 5,387,651
[45] Date of Patent: Feb. 7, 1995

[54] BLOCK COPOLYETHERAMIDE SUITABLE FOR INJECTION MOLDING AND PROCESS FOR PREPARING IT

[75] Inventor: Aldemaro Ciaperoni, Milan, Italy

[73] Assignee: Enichem S.P.A., Milan, Italy

[21] Appl. No.: 91,748

[22] Filed: Jul. 15, 1993

Related U.S. Application Data

[63] Continuation of Ser. No. 725,444, Jul. 3, 1991, abandoned.

[30] Foreign Application Priority Data

Jul. 5, 1990 [IT] Italy ............................... 20873 A/90

[51] Int. Cl.$^6$ ............................................. C08L 77/12
[52] U.S. Cl. ................................. 525/408; 525/420; 525/434; 528/310
[58] Field of Search ................. 525/420, 408, 434; 528/310

[56] References Cited

U.S. PATENT DOCUMENTS

| | | | |
|---|---|---|---|
| 2,564,001 | 8/1951 | Genas | 260/78 |
| 3,173,898 | 3/1965 | Sum | 260/78 |
| 3,650,999 | 3/1972 | Martins | 260/220 |
| 3,839,245 | 10/1974 | Schlossman | 260/18 N |
| 4,053,441 | 10/1977 | Wagener | 260/18 N |
| 4,252,920 | 2/1981 | Deleens | 525/430 |
| 4,346,200 | 8/1982 | Woodbrey | 525/421 |
| 4,501,861 | 2/1985 | Woodbrey | 525/421 |
| 4,873,296 | 10/1989 | Ciaperoni et al. | 525/434 |

FOREIGN PATENT DOCUMENTS 156035 10/1985 European Pat. Off. .

Primary Examiner—James J. Seidleck
Assistant Examiner—I. Zemel
Attorney, Agent, or Firm—Oblon, Spivak, McClelland, Maier & Neustadt

[57] ABSTRACT

Block copolyetheramide suitable for injection molding, consisting of polyamide blocks and polyalkylene ether blocks and having a melting point ranging from 215° to 223° C., an apparent viscosity, at 230° C., ranging from 50 to 150 Pa, a number average molecular weight ranging from 10,000 to 50,000 and a yellow degree, measured by means of an Elrepho ® apparatus, lower than or equal to 20. They are prepared by polymerizing the polyamide monomers in the presence of hypophosphorous acid or meta-hypophosphorous acid and then by polycondensing the polyamide with polyalkylene ether having hydroxyl end groups.

5 Claims, No Drawings

BLOCK COPOLYETHERAMIDE SUITABLE FOR INJECTION MOLDING AND PROCESS FOR PREPARING IT

This application is a continuation of application Ser. No. 07/725,444, filed on Jul. 3, 1991, now abandoned.

The present invention relates to block copolyetheramides suitable for being utilized in injection molding, and to a process for preparing them.

As is known, injection molding is a usual and conventional technique for transforming thermoplastic polymeric materials into shaped bodies by causing the material in the molten state to flow into a mold.

The main requirement which a thermoplastic material has to meet for such application is high fluidity in the molten state, since high flowability permits a fast, perfect and complete filling of the molds, particularly in the case of very thin formed articles and of complex shapes.

It is known that the flowability of a material can be enhanced by increasing the molding temperature, but generally the temperature increase involves reactions causing a degradation of the material and, as a consequence, undesired colorings in the molded article.

In order that a thermoplastic polymeric material may have a proper fluidity in the molten state to be advantageously utilized in the injection molding technology it is necessary not only that its molecular weight should be regulated, also in view of its physico-mechanical properties, but also and chiefly that it should be free from cross-linkings and/or chemical structures capable of giving rise to cross-linking due to heat, and/or from ionic structures and/or aromatic structures. When aromatic structures are present either alone or in combination with ionic groups, the temperatures necessary for molding are higher owing to phenomena which hinder the flow in the molten state; furthermore, the presence of ionic groups leads to the formation of polar groups or cross-linked structures or in general to intermolecular associations (see Enc. Scienza e Tecnologia dei Polimeri, Ed. Mark, vol. 12, page 76), which impart a higher rigidity to the material, it thus becoming necessary to operate at higher temperatures.

Such a situation is enhanced when the polymer to be molded consists of polyamides or copolyamides, in which the presence of polar —CONH—groups involves strong interactions with other polar groups of ionic nature, with formation of intermolecular bonds, which adversely affect the fluidity of said materials under hot conditions.

This phenomenon is particularly evident in the case of the copolyetheramides having a block structure, in the sense that polymeric segments of polyamides alternate, in a random or ordered manner, with polyalkylene ether segments. Therefore, also in the case of copolyetheramides it is necessary to raise their fluidity in the molten state in order to render them suitable for being utilized in the conversion process by injection molding, rotational molding, blast molding and extrusion molding.

The block copolyetheramides are well known and broadly described in patent literature and they are utilized for the manufacture of fibres, as is described in patents FR-A-1,550,252, GB-A-1,062,547, GB-A-793,451, U.S. Pat. No. 3,044,987, EP-A-156,035, or in the field of plastics as is described in GB-A-1,270,097, U.S. Pat. No. 3,522,329 and U.S. Pat. No. 4,346,200.

Block copolyetheramides can be prepared either by reacting polyamide blocks preformed with polyalkylene ether containing hydroxyl end groups, in the molten state in a hot mixing unit, or by causing the polyamide monomers to polymerize in the presence of a polyalkylene ether containing hydroxyl end groups; or also by first preparing the polyamide blocks and by adding, at the end of the polymerization, the polyalkylene blocks containing the hydroxyl end groups, as is described for example in U.S. Pat. No. 4,873,296.

Polyalkylene ethers containing aminic end groups, as a partial or total substitute for the hydroxyl groups, can be utilized as well.

In particular, it is preferable to firstly prepare a polyamide such as, for example, polycaprolactam, terminated with carboxylic groups, and then to esterify the carboxylic groups with the polyalkylene ether hydroxyl groups. As is known, the esterification of the free carboxylic end groups of the polyamide with the hydroxyl groups of the polyalkylene ether occurs in the molten state, generally at temperatures higher than 220° C. under vacuum and preferably in the presence of catalytic amounts of titanium organic compounds (see Europ. Poly. Sc. 13, 353, 1977 and U.S. Pat. No. 4,873,296) as esterification catalysts.

However, the titanium organic compounds have the drawback of producing cross-linked structures and of imparting an undesired yellow coloring to the polymer.

It is also known to prepare polyamides in the presence of one or more mono- or polyfunctional acids. Said acids react with the free aminic groups of the polyamide, thereby partially or fully stopping—depending on the added amount—the condensation reaction between the aminic groups and the carboxylic groups of said polyamide.

Suitable acids proposed for this purpose are the acetic, adipic, sebacic, citric, trimesic acids and the like. Also the phosphorous acids such as phosphoric or phosphorous acids, phosphonic acids, have been suggested for this purpose. However, the phosphorous acids, and in general the polyfunctional acids, are affected by the drawback of forming cross-linked structures particularly when they are utilized at temperatures higher than 220° C.; furthermore, the formation of cross-linked structures is favored by the presence of phosphorous-amidic derivatives of acidic nature according to the scheme:

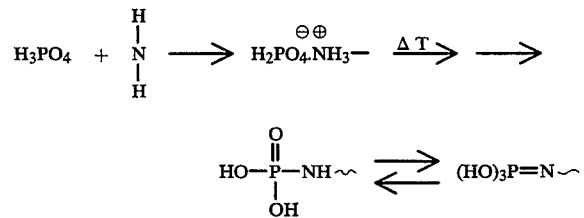

Furthermore, the acidity of phosphoramides catalyzes the degradation reactions of the polyalkylene ethers, particularly at high temperatures, with consequent worsening of the chemico-physical and rheological properties of the resulting copolyetheramides.

According to the present invention, all the problems connected with the low fluidity of copolyetheramides in the molten state can be solved and block copolyetheramides suitable for injection molding can be obtained if they are prepared under the following conditions:

a) carrying out the polymerization of the polyamide monomers in the presence of catalytic amounts of hypophosphorous or meta-hypophosphorous acid;

b) carrying out the polymerization of the polyamide monomers in the complete absence of polyalkylene ethers; and c) carrying out the polycondensation between the carboxylic end groups of the polyamide and the hydroxylic groups of the polyalkylene ethers, in the absence of any polycondensation catalyst and under vacuum lower than 100 mm Hg (13,332 Pa), at temperatures higher than the polyamide melting temperature.

Thus, an object of the present invention is a block copolyetheramides having a melting point ranging from 215° to 223° C.; an apparent viscosity, at 230° C., ranging from 50 to 150 Pa.sec.; a number average molecular weight ranging from 10,000 to 50,000 and a yellow degree lower than or equal to 20, measured by means of the Elrepho apparatus; said block copolyetheramides being obtained by carrying out the polymerization of the polyamide monomers in the presence of catalytic amounts of hypophosphorous or meta-hypophosphorous acid, in the complete absence of polyalkylene ethers, and by subsequently polycondensing the acid end groups of the polyamide blocks with the hydroxyl end groups of the polyalkylene ether blocks, in the absence of polycondensation catalysts and under vacuum lower than 100 mm Hg (13,332 Pa), at temperatures higher than the polyamide melting temperature.

The block copolyetheramides prepared according to this process essentially comprise two types of blocks or segments, one of which is polyamidic and the other is polyalkylene ether, which are chemically bound and distributed in a random or ordinate manner.

In the copolyetheramides of the present invention, the polyamidic groups have a number average molecular weight ranging from 2,000 to 20,000, preferably from 4,000 to 16,000, and the polyalkylene ether blocks have a number average molecular weight ranging from 160 to 10,000, preferably from 300 to 4,000.

The copolyetheramides of the present invention have a number average molecular weight ranging from 4,300 to 50,000, preferably from 15,000 to 30,000.

The polyalkylene ether amount contained in the block copolyetheramides of the present invention can range from 0.5% to 30% by weight and preferably it ranges from 1% to 15% by weight.

The chemical bonds between the polyamidic blocks and the polyalkylene ether blocks are of the ester type, and therefore they derive from the reaction of the carboxylic end groups of the polyamidic blocks with the hydroxyl end groups of the polyalkylene ether end groups. Such bonds can be also of the amidic type, namely deriving from the reaction of the carboxylic end groups of the polyamidic blocks with the aminic end groups of the polyalkylene ether blocks, in the case that such type of polyalkylene ethers is utilized.

The hypophosphorous or meta-hypophosphorous acid, which is utilized in catalytic amounts in the preparation of the polyamide, acts not only as a polymerization catalyst, but also as a molecular weight regulator. In fact, it binds to the aminic end groups of the polyamide, thereby preventing the latter from reacting with the acid groups of the polyamidic blocks or of the polyalkyleneoxide blocks.

The hypophosphorous or meta-hypophosphorous amount which is added to the polymerization medium can vary from 0.01 to 50 mols/ton of monomer, in particular from 0.05 to 20 mols/ton of monomer and preferably from 0.1 to 5 mols/ton of monomer.

The monomers utilized for preparing the polyamidic blocks are the conventional ones and comprise the mono-amino-mono-carboxylic acids containing at least 2 carbon atoms between the aminic group and the carboxylic group; the lactams, or a substantially equimolar mixture of an alkylenediamine, containing at least two carbon atoms between the aminic groups, and of an aliphatic dicarboxylic acid, for example an equimolar amount of hexamethylene diamine and adipic acid, salified in water according to known methods.

Particularly preferred monomers of the present invention are the lactams of formula:

(I)

wherein p is an integer ranging from 2 to 11.

Examples of lactams having the above general formula (I) are beta-propiolactam, gamma-butyrolactam, delta-valerolactam, epsilon-caprolactam, enantolactam, omega-lauryl-lactam, caprilactam etc. Epsilon-caprolactam is particularly preferred.

The polyalkylene ethers containing hydroxyl groups or aminic groups, utilized for preparing the copolyetheramides of the present invention are compounds having the general formula:

$$X-R_1-(OR_2)_n-OR_3-X_1 \qquad (II)$$

wherein:

$R_1$, $R_2$ and $R_3$, like or different from each other, represent saturated aliphatic divalent radicals having a straight or branched chain, containing from 1 to 10 carbon atoms; X and $X_1$, like or different from each other, represent —OH or —NH$_2$, and n is an integer selected to impart a molecular weight ranging from 160 to 10,000.

Examples of polyalkylene ethers of formula (II) are: poly(ethylenoxide)glycol, poly(1,2-propylene oxide)glycol, poly(1,3-propylene oxide)glycol, poly(tetramethylene poly(1,3-propylene oxide)glycol, poly(tetramethylene oxide)glycol, poly(pentamethylene oxide)glycol, poly(hexamethylene oxide) glycol, poly(heptamethylene oxide) glycol, poly(octamethylene oxide)glycol, poly(nonamethylene oxide)glycol, poly(decamethylene oxide)glycol and poly(1,2-butylene oxide)glycol; random copolymers or block copolymers of ethylene oxide and 1,2-propylene oxide, etc.

Poly(ethylene oxide)glycol and/or poly(tetramethylene oxide)glycol are particularly preferred in the present invention.

The process for preparing the copolyetheramides, which is another object of the present invent ion, essentially comprises polymerizing the monomers forming the polyamide by means of any known polymerization technique and in the presence of catalytic amounts of hypophosphorous or meta-hypophosphorous acid to obtain polyamide blocks (A) having a molecular weight in the above-indicated ranges, and subsequently reacting the polyamide blocks so obtained with polyalkylene ether blocks containing hydroxyl end groups, in stoichiometric ratios selected in such manner as to obtain copolyetheramides having ordered or random blocks.

The condensation reaction between the polyamide blocks and the polyalkylene ether blocks is carried out in the absence of any polycondensation catalysts, under vacuum lower than 100 mm Hg (13,332 Pa) and at a temperature higher than the polyamide block melting temperature. The polycondensation temperatures generally are from 210° to 275° C.

The lactam polymerization is preferably conducted in the presence of water in an amount ranging from 1 to 10% by weight calculated on the lactam, and preferably from 2 to 5%.

The polymerization cycle of the lactam or of water solutions of diamine-diacid salts, comprises heating the reaction mixture above 200° C. under an autogenous pressure of 1–15 atm., and then gradually reducing the pressure until reaching atmospheric pressure; the time ranges from 90 minutes to 3 hours.

To the polyamide so produced there is added, in a nitrogen stream or under a slight vacuum, the polyalkylene ether containing hydroxyl end groups. The added polyalkylene ether amount depends on the type of copolyetheramide and in particular on the properties required.

The esterification reaction between the acid groups of the polyamide and the hydroxyl groups of the polyalkylene ether takes place under vacuum, lower than 100 mm Hg, at temperatures higher than the polyamide melting temperature and, according to the present invention, in the absence of esterification catalysts.

In fact it has surprisingly been found that the esterification reaction under vacuum is considerable accelerated when a polyamide is used which is obtained by carrying out the polymerization of the lactam or of the monomer forming the polyamide in the presence of hypophosphorous or metahypophosphorous acid.

The use of vacuum (lower than 100 mm Hg) in the course of the condensation process between the polyamide block and the polyether block, allows the elimination of the monomer lactam during this procedure, whereby the following advantages are realized:
- avoiding the washing and drying process steps;
- the possibility of using the lactam distilled in the successive polymerization step;
- ecological advantages deriving from the absence of draining the waste water.

As mentioned hereinbefore, the copolyetheramides of the present invention are advantageously used in injection molding for the production of molded articles having high impact resistance and excellent physico-mechanical properties. Due to such characteristics, the copolyetheramides of the present invention can be used in automotive, electronic and technical fields in the form of cases, cups, boxes, containers, panels, sheets, plates, films, rods and the like. Furthermore, the copolyetheramides of the present invention can be mixed with other polymers in order to impart particular processability properties, and with various additives, such as stabilizers, antiflame agents, dyes, pigments, filling agents, organic and inorganic fillers, which are generally utilized in the manufacture of formed bodies.

For a better understanding of the present invention and for reducing it to practice, a few illustrative but by no way limitative examples are given hereinafter.

The methods employed for determining the characteristics of the copolyetheramides of the present invention are as follows:

Molecular Weight

The number average molecular weight of the polyamide is determined by titration of the carboxylic end groups after the polyamide has been extracted with water and dried.

The number average molecular weight of the polyalkylene ether is determined by titration of the hydroxyl (and/or optionally aminic) end groups.

The number average molecular weight ($\overline{Mn}$) of the copolyetheramide is determined by the relation:

$$\overline{Mn} = \frac{\overline{Mn}^E \cdot 100}{X}$$

wherein:
$\overline{M}^E$ is the number average molecular weight of the polyalkylene ether; and
X is the polyalkylene ether amount (in % by weight) which is bound in the copolyetheramide.

X is determined by titration of the iodine which is released owing to the disassociation of the copolyetheramide with hydriodic acid, after treatment of the copolyetheramide with boiling water for eight hours and drying.

Melting Point

The melting point is determined by differential thermal analysis in nitrogen, with a rate of scanning of 10° C./minute, using a dried polymer having a residual water content of 0.04–0.05% by weight.

Apparent Viscosity

The apparent viscosity is measured at 230° C., at a shear rate of 10 sec.$^{-1}$ Pas., using a Brabender ® Rheometer with a capillary tube having a length of 50 mm and a diameter of 0.5 mm.

Yellow Degree

The yellow degree is measured by means of an Elrepho ® apparatus at room temperature.

EXAMPLE 1

Into a stainless steel 5-liter autoclave equipped with a stirrer and, on the bottom, with an extrusion valve, there were introduced 45.6 parts of hypophosphorous acid, 50 parts of water and 1,000 parts of caprolactam (CPL). The resulting mixture was heated in a nitrogen atmosphere to 240° C. and maintained at this temperature for 3 hours, taking care that the pressure does not exceed 4 bar; these conditions were maintained for 1 hour more. The pressure was brought again to atmospheric pressure within 90 minutes.

The number average molecular weight of the obtained polycaprolactam was equal to 9,410.

At the end of the operation, from a container maintained in a nitrogen atmosphere, there were added, into the autoclave, 100 parts of poly(oxyethylene)glycol heated to 63° C., having a molecular weight equal to 2,000. The mixture was maintained under stirring by continuously reducing the pressure, until it reached a residual pressure of 50 Pa within 5 hours at a temperature of 250° C. At the end, the resulting copolyetheramide was extruded from the autoclave by means of nitrogen pressure of 12 bar. The resulting block copolyetheramide exhibited the following properties:

| | |
|---|---|
| melting point | 219.8° C. |
| number average molecular weight | 21,040 |
| poly(oxyethylene)glycol | 9.3% |
| yellow degree | 7 |

| | |
|---|---|
| apparent viscosity | 127 Pa.sec. |

EXAMPLE 2

It was carried out according to the modalities of example 1, by polymerizing 1,000 parts of caprolactam in the presence of 23 parts of hypophosphorous acid and 50 parts of water. At the end of the polymerization reaction, the number average molecular weight of the polycaprolactam was 13,010. 90 parts of poly(oxybutylene)glycol having a number average molecular weight of 3,060 were added into the autoclave, and the operation was continued according to example 1. The obtained block copolyetheramide exhibited the following characteristics:

| | |
|---|---|
| melting point | 215.8° C. |
| number average molecular weight | 16,085 |
| poly(oxybutylene)glycol | 12.1% |
| yellow degree | 3 |
| apparent viscosity | 72 Pa.sec. |

I claim:

1. Block copolyetheramide suitable for injection molding, having a melting point ranging from 215° C. to 223° C. an apparent viscosity, at 230° C., ranging from 50 to 150 Pa.sec., a number average molecular weight ranging from 4,300 to 50,000 and a yellow degree lower than or equal to 20 measured by means of an Elrepho apparatus, said copolyetheramide comprising two types of blocks or segments, one of which being polyamide and the other polyalkylene ether, chemically bound to each other, the polyamide block being produced in the presence of catalytic amounts of hypophosphorous acid or metahypophosphorous acid and in the absence of a polyalkylene ether, and the polycondensation between the polyamide blocks and the polyalkylene ether blocks being carried out, in the absence of a polycondensation catalyst and under vacuum lower than 100 mm Hg at temperatures higher than the polyamide block melting temperature, wherein the polyamidic blocks are produced by polymerization of lactams having the formula:

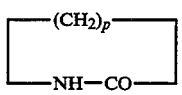

wherein p is an integer ranging from 2 to 11, wherein the polyalkylene ether is of poly(ethylene oxide)glycol and its amount ranges from 1 to 15% by weight.

2. Block copolyetheramide according to claim 1, wherein the polyamide blocks have a number average molecular weight ranging from 2,000 to 20,000, and the poly(ethylene oxide) blocks have a number average molecular weight ranging from 160 to 10,000.

3. Block copolyetheramide according to claim 1, wherein the polyamide blocks have a number average molecular weight ranging from 4,000 to 16,000, and the poly(ethylene oxide) blocks have a number average molecular weight ranging from 300 to 4,000.

4. Block copolyetheramide according to any one of claims 1 or 2 or 3, having a number average molecular weight ranging from 15,000 to 30,000.

5. Block copolyetheramide according to any one of claims 1, 2 or 3, wherein the polyamidic blocks are poly-epsilon-caprolactam.

* * * * *

UNITED STATES PATENT AND TRADEMARK OFFICE
CERTIFICATE OF CORRECTION

PATENT NO. : 5,387,651
DATED : FEBRUARY 7, 1995
INVENTOR(S) : ALDEMARO CIAPERONI

It is certified that error appears in the above-identified patent and that said Letters Patent is hereby corrected as shown below:

COL.  LINE 6,    15,   please delete "$M^\varepsilon$" and insert --$\overline{Mn}^\varepsilon$--.

Signed and Sealed this

Twenty-fourth Day of October, 1995

Attest:

BRUCE LEHMAN

Attesting Officer        Commissioner of Patents and Trademarks